United States Patent Office 3,546,851
Patented Dec. 15, 1970

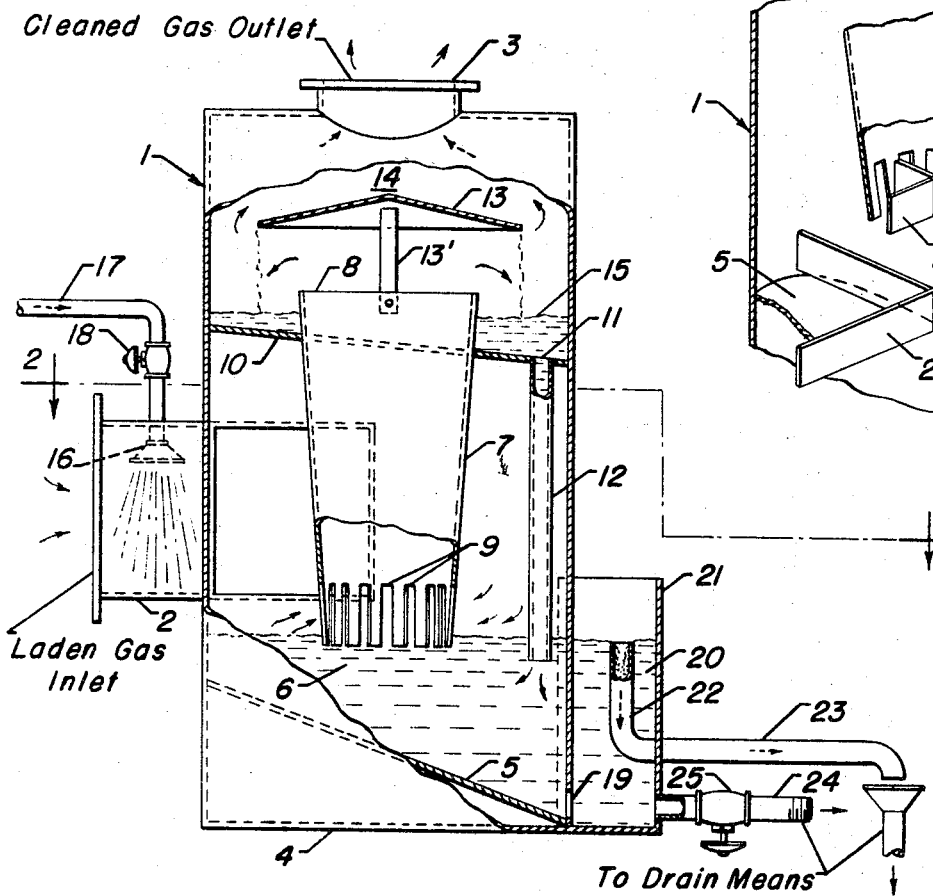
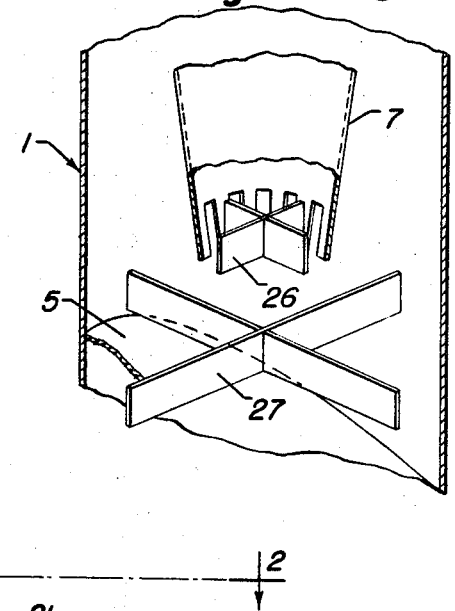
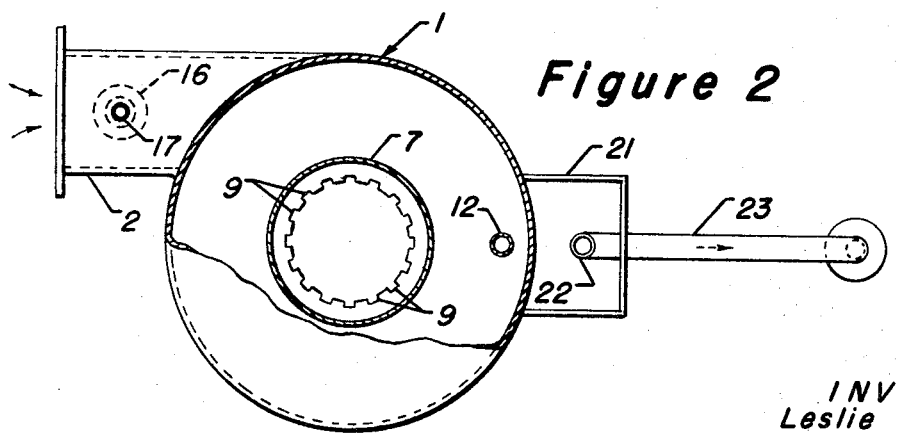

3,546,851
GAS SCRUBBING APPARATUS
Leslie C. Hardison, Norwalk, Conn., Edward H. R. Pegg, Port Chester, N.Y., Dom E. Reedy, Stamford, and James M. Barr, Norwalk, Conn., assignors to Universal Oil Products Company, Des Plaines, Ill., a corporation of Delaware
Filed Dec. 20, 1968, Ser. No. 785,472
Int. Cl. B01d 47/02
U.S. Cl. 55—238                                    7 Claims

ABSTRACT OF THE DISCLOSURE

A two-stage scrubber unit combining a cyclone and liquid mixing and spray means in the inlet thereof with a frusto-conical tube having 360° of slotted passageways for upward flow through an axially positioned diverging frusto-conical path so as to obtain the effects of further gas-liquid mixing. Separated entrained particles and liquid are returned to the lower end of the unit and a liquid level is maintained therein to be at the lower end of the center cone section and adjacent to the slotted gas inlet openings thereto around the periphery of the cone.

---

This invention relates to an improved and simplified form of gas scrubbing unit for particle laden gaseous streams. More particularly, the improved unit provides for a two-stage type of scrubbing operation by having liquid spray into the gas stream and effecting centrifugal flow mixing between the two streams and then, in a second stage, having a high energy gas-liquid mixing provided by the gas flow being channeled through a plurality of slotted openings leading into the bottom of a diverging cone section.

There are, of course, many forms or types of gas scrubbing apparatus which have embodied centrifugal flows and there have been varying liquid spray arrangements to effect the wetting of the particular gas stream. Various combinations of gas stream wetting and liquid-particle separation means have also been tried or used in connection with the scrubbing of laden gas stream; however, the known types of devices have not effected the present combination of wetting and scrubbing steps to provide a simplified form of two-stage scrubber unit.

SUMMARY OF THE INVENTION

It may be considered a principal object of the present invention to provide two successive stages of wetting and mixing between a gaseous stream and a liquid scrubbing medium.

It may be considered a further object of the present invention to provide a scrubber unit which uses spray wetting and centrifugal mixing between the liquid and gas streams as well as high energy wetting and mixing as the gaseous stream is subsequently channeled through a plurality of wetted slots positioned around the lower gas inlet periphery of a diverging cone section.

In a broad embodiment, the improved gas scrubber unit comprises in combination a vertically positioned cylindrical housing having a tangential gas inlet to the lower interior portion thereof and a cleaned gas outlet from the upper end thereof, an elongated open-ended frusto-conical section having slots spaced 360° around the smaller lower periphery thereof and being positioned axially within the interior of said housing, a transverse partition extending between the inside wall of said housing and said axially positioned frusto-conical section adjacent the upper end thereof, a gas stream deflector positioned over and spaced from the top of said conical section, a liquid spray inlet to said gas inlet so as to provide distributed liquid flow into said gas stream and to said housing, a liquid outlet means from the lower end of said housing positioned and operative to provide a liquid level across said slots in the lower periphery of said conical section, whereby liquid is entrained with inward and upward gas flow through such slots and then carried upwardly through the conical section to the outlet of the housing, and a liquid conducting means down from said transverse partition whereby to return collected liquid from there above to the lower interior portion of said housing.

In a preferred design, the scrubbing unit will have a liquid spray means within the laden gas inlet section such that the entire stream will be uniformly wetted prior to initiating the centrifugal flow within the housing itself. The centrifugal action or flow within the interior of the housing will assist in effecting a mixing between the liquid spray and the entrained particles being carried with the gaseous stream such that resulting wetted particulates will be centrifugally thrown to the inside wall of the housing and permitted to descend into the lower portion thereof for withdrawal. It may also be noted, that a preferred design will utilize an enclosed pipe or downspout arrangement for effecting the passageway of collected liquid from the upper portion of the housing to the lower interior portion so that the incoming gas stream can not in any way bypass the cone section to reach the outlet at the top portion of the scrubbing unit.

In still another aspect, a preferred design of the present simplified scrubbing unit, makes use of a liquid withdrawal means that permits a ready access from the outside of the apparatus such that in the event of any clogging by large sized solid materials there can be manual and easy cleaning of the liquid draw-off zone.

Reference to the accompanying drawing and the following description thereof will serve to illustrate one embodiment of the present simplfied form of two-stage gas scrubbing apparatus and, at the same time, additional advantageous features of construction and operation thereof will be set forth.

DESCRIPTION OF THE DRAWING

FIG. 1 of the drawing is a diagrammatic sectional elevational view indicating the construction and operation of the simplified gas scrubbing unit.

FIG. 2 of the drawing is a sectional plan view, as indicated by line 2—2 in FIG. 1, particularly showing the tangential gas inlet into the inside of the scrubber housing.

FIG. 3 of the drawing shows diagrammatically the use of flow straightening vanes, positioned within the lower portion of the cone section, as well as wave dampening vanes in the liquid reservoir section.

Referring now to FIGS. 1 and 2 of the drawing, there is indicated a vertically oriented housing section 1 having a tangential laden gas inlet 2 and an upper cleaned gas outlet 3. The lower end of the housing, above a bottom plate 4 is provided with a sloping interior plate section 5 which in turn provides for a sloping bottom to a liquid retaining section 6.

Positioned axially within the central portion of the housing 1, is a frusto-conical section 7 which is open at each end thereof and arranged to diverge upwardly to an enlarged upper end portion 8. The lower end of the cone section 7 is provided with a plurality of slots 9 that extend around the entire periphery thereof so as to permit 360° of inward flow of an entire gas stream from the interior of the housing 1. Positioned adjacent the top portion of cone 7 and extending transversely across the entire interior of the housing 1 is a sloping transverse partition member 10 which, in turn, is provided with an opening 11 leading into a depending pipe 12. The latter preferably extends downwardly into the lower end portion of the housing to a level slightly below the lower end of the cone section 7 such that its open lower end is within the liquid 6 maintained in the lower end of the housing. The provision for recirculating the scrubbing liquor from above partition 10 into the liquid retaining section 6 is, of course, of desirable economic advantage.

Within the upper portion of the housing 1, and spaced above the open end 8 of cone section 7, there is a deflector plate or cone member 13 which will serve to preclude the direct outward flow of the scrubbed gas stream from the cone section 7 to outlet 3. In other words, the gas flow will be channeled laterally by deflector cone 13 into a gas-liquid separation zone 14 and thence permitted to enter the outlet section 3. Any liquid droplets which are entrained with the gas stream from the top of cone section 7 will impinge upon the lower side of the plate 13 and then drop therefrom into a liquid collection zone 15 provided above the top of transverse plate 10 and below the top level of cone section 7.

In combination with the laden gas inlet 2, there will be provided a suitable spray means 16 which is supplied with water, or other scrubbing liquid, from line 17 with control valve 18. Thus, as noted hereinbefore, there will be the provision for effecting the initial spraying and wetting of entrained particulates in the gas stream entering the tangential gas inlet 2. As the liquid sprayed gas stream enters the interior of housing 1 there will preferably be a wetting of the entire cross-section of the stream and then a resulting centrifugal flow of the entire gas stream at high velocity so as to centrifuge wetted particulates to the interior wall of the housing 1 where they are permitted to descend into the liquid retaining zone 6. The gas stream, with at least a substantial portion of all of the larger particulates removed, will then be forced to flow through the slot means 9 around the lower end of the cone section 7 and then carry upwardly through the diverging cone to the separation section 14 prior to being discharged by way of outlet 3. Generally, the vertical height or length of the cone section 7 will be such as to permit a loss in velocity of the entrained liquid droplets and particulates so that a large portion of the liquid will be maintained within the interior height of the cone 7 and fall downwardly along the interior wall thereof to reach the zone of the slots 9. However, some portion of entrained liquid will carry to the under side of baffle plate 13 and drip from the edges thereof to the designed collection area 15.

Thus, in the actual operation of the unit, the high velocity entrance of the gas stream through the plurality of the narrow slots 9 will be for the full 360° of the cone and through wetted-wall slots such that there is again a high energy mixing of liquid with the gas stream to insure the wetting of all of the remaining particulates that may be entrained therein. The high energy and high velocity of the gas stream may also be such that it tends to entrain some additional liquid from the top surface of the liquid reresvoir maintained within the lower zone 6 in the housing. It is thus obvious that there is provided by the present design and arrangement an efficient two-stage liquid contacting of the gaseous stream. First, there is the initial liquid spray distribution into the gas stream at the tangential gas inlet opening and a subsequent redistribution and wetting of the gas stream as it passes through the plurality of spaced slots 9. Such additional wetting of the redistributed stream results from the downward wetted wall flow in the cone section 7 and from the high level of liquid 6 maintained in the lower portion of the scrubbing chamber. The liquid discharge means from the latter is, of course, such that the top of the liquid from reservoir zone 6 will be slightly above the level of the lower end of cone section 7 and the slots 9; however, the level should not be so high as to block the gas flow area provided by the plurality of slots 9 and preclude proper gas flow into the interior of cone section 7.

Liquid flow with recovered and settled particulates will pass from the lower portion of liquid retaining section 6 by way of opening means 19 into an outer liquid discharge section 20 maintained within an outlet box means 21. The latter is preferably open-topped and shall carry to a height sufficient to be above the normal liquid level maintained in the liquid reservoir zones 6 and 20. The open top arrangement for the outlet box 21 will permit easy access into section 20 for removing undesired sediment or large sized debris that may tend to block normal liquid flow outwardly by way of stand pipe section 22 and pipe 23. Also, as a safety arrangement, there may be provided an overflow drain or funnel arrangement for receiving flow from pipe outlet 23 so that in the event of downstream blockage, there can be overflow into a floor drain or other auxiliary drain means. The top of pipe 22 is carefully set so as to maintain the proper desired liquid level in zone 6 and at slots 9. In order to remove sludge or settled particles, there will be a separate lower outlet pipe 24 with valve means 25, to regulate the flow therefrom as may be required. The water addition rate through line 17 to nozzle 16 will be an amount that is in excess of that required for humidification of the laden gas stream and, in addition, sufficient to insure a free flow of liquid from the lower end of the unit to preclude clogging from solids concentration.

It is, of course, not intended to limit the present invention to any one means for controlling liquid level or to any one specific liquid withdrawal means although, in accordance with the present invention, the outlet means have at least one access opening which will permit the manual, or auxiliary pump, removal of settled particulates and the cleaning of any pipe slugging debris carrying to the lower outlet portion of the housing. Also, there shall be an overflow weir or other secondary drainage means to insure the removal of liquid from the bottom of the chamber where the liquid level raises above normal, but will spill over a predetermined height, so as to permit gas flow to continue inwardly through the slot means 9.

The entire gas scrubbing unit may be fabricated to be of varying sizes in order to accommodate varying quantities of particle laden gas flow, as well as of different materials to suit varying types of scrubbing liquid may be utilized. Generally, water will be utilized as the scrubbing liquid except in those instances where the contaminated gas stream has fumes or particulates that indicates an advantage to having a particular type of scrubbing liquor. For example, an alkaline liquid may be used in order to assist in neutralizing the effects of an acidic contaminated gas stream. Also, although not shown in the drawing, there may be the addition of a suitable mist extraction means within the interior upper portion of the unit adjacent the gas outlet means.

The size of the interior axially positioned cone section 7 will vary in accordance with the gas flow quantity and its velocity, while the height of the housing 1 will normally vary in accordance with the desired height of the cone section 7. Generally, the cone will be of sufficient length and have sufficient slope or upward divergence, to provide for a substantially complete de-entrainment of liquid from the gaseous stream as it carries upwardly for the full height of the cone section 7. Although, as noted hereinbefore, by providing the deflector plate 13 at a spaced distance above the cone section 7 there may be insured further adequate removal of entrained liquid and particulates and a baffling of the gas flow prior to its reaching the outlet zone 3. In the present embodiment, the deflector cone 13 is indicated as being supported from spaced support members 13' carrying to the top section of the cone section 7; however, other suitable support means may be provided.

Referring now to FIG. 3 of the drawing, there is shown a plurality of radially extending straightening vanes 26 within the lower portion of the cone section 7, which vanes may be used in an embodiment to reduce a vortex type flow in the cone and enhance the operation. In addition, it appears that the use of such vanes will recover some of the energy used in the first stage of contact, where there is tangential acceleration of the gas around the cone 7 and within the interior of the housing 1. Generally, the vanes 26 need not extend much above the slotted area; however, a varying number, or varying types, of vanes may well be made within the scope of the present invention. Also shown in FIG. 3 is the use of radially extending vanes 27 within the liquid retaining section 6, below the end of cone 7. These vanes 27 will be positioned such that they would be slightly below the liquid level in the housing, but high enough therein to serve to reduce or dampen some of the wave action that may occur within the body of liquid in section 6 by reason of the high velocity swirl from tangential gas inlet to the unit. Varying sizes and forms of vanes may of course be used in this liquid zone to provide the desired operational effect.

Actually, it should again be pointed out that the present drawing shows merely one diagrammatic embodiment and that various structural modifications may well be made in effecting the construction and assembly without departing from the spirit of the present invention in providing a simple compact arrangement for a two-stage scrubbing of a laden gas stream. A first stage wetted centrifugal effecting separation of the heavier or larger particles and a flow through wetted slots into a rising and diverging cone effecting a separation of smaller particulates.

We claim as our invention:

1. A unitary multi-stage gas scrubbing apparatus for removal of entrained particles in a gaseous stream which comprises in combination, a vertically positioned cylindrical housing having a closed lower end and a tangential gas inlet to the lower interior portion thereof and a cleaned gas outlet from the upper end thereof, an elongated open-ended frusto-conical tube mounted with the wider diameter thereof upmost for substantial de-entrainment of liquid in said stream, said frusto-conical tube having spaced slots 360° around the periphery at the bottom thereof and being positioned coaxially within the interior of said housing, a body of liquid withn the lower porton of the housing having a liquid surface at the level of the bottom of the slots whereby the gas must travel through the slots into the tube, a transverse partition extending between the inside wall of said housing and said coaxially positioned frusto-conical tube adjacent the upper end thereof, a gas stream baffle extending transversely of the housing and positioned over and spaced from the top of said frusto-conical tube, a liquid spray inlet extending into said gas inlet so as to provide distributed liquid flow into said gas stream and to said housing, a liquid outlet means from the lower end of said housing to maintain a liquid level across the lower end of said slots in said frusto-conical tube, whereby liquid is entrained with inward and upward gas flow through such slots and then carried upwardly through the frusto-conical section tube to the outlet of the housing, and a liquid conduit extending down from said transverse partition into the body of liquid.

2. The gas scrubbing apparatus of claim 1 further characterized in that said liquid spray inlet to said gas inlet is provided to effect substantially complete spraying of liquid droplets across the entire cross-sectional area of the tangential gas inlet to the housing with such spray means being exterior of the housing portion itself, whereby the gas stream is wetted before entry into a centrifugal path within the interior of the housing.

3. The gas scrubbing apparatus of claim 1 further characterized in that said liquid outlet means includes a liquid outlet section having access means thereto from above the liquid level therein to permit the periodic removal of any clogging solid materials therein.

4. The gas scrubbing apparatus of claim 1 further characterized in that said liquid outlet means incorporates an open-topped vertical stand pipe section exteriorally of said vessel to permit discharge of liquid from above a predetermined upper level and a second, lower positioned, liquid outlet means provides for sludge removal from the lower portion of the liquid outlet means.

5. The gas scrubbing apparatus of claim 1 further characterized in that said liquid outlet means includes a liquid discharge stand pipe means external to said housing providing a liquid level in said housing which will retain a desired liquid in the lower end porton thereof to reach said slots in the lower end of said conical section.

6. The gas scrubbing apparatus of claim 1 further characterized in that a plurality of vanes are positioned in the lower portion of said frusto-conical tube, with each of such vanes extending radially from the lower axis of such tube of the frusto-conical tube.

7. The gas scrubbing apparatus of claim 1 further characterized in that a plurality of radially extending vanes are positioned in the lower portion of said housing below about the level of the lower end of said frusto-conical tube whereby wave action of liquid in said lower section will be reduced.

References Cited

UNITED STATES PATENTS

| 1,110,868 | 9/1914 | Bauer | 261—79.1 |
| 2,214,658 | 9/1940 | Browning | 55—398 |
| 2,527,015 | 10/1950 | Lhota | 55—230 |
| 2,575,359 | 11/1951 | Ortgies | 55—227 |
| 3,064,408 | 11/1962 | Erga et al. | 55—94 |
| 3,304,697 | 2/1967 | Ramsey | 55—459 |
| 3,409,409 | 11/1968 | Socket Sr. | 55—227 |
| 3,412,529 | 11/1968 | Tailor | 55—94 |

FOREIGN PATENTS

| 213,386 | 3/1958 | Australia | 55—237 |

FRANK W. LUTTER, Primary Examiner

B. NOZICK, Assistant Examiner

U.S. Cl. X.R.

55—239, 257, 416; 261—79